US005414601A

United States Patent [19]

Davenport et al.

[11] Patent Number: 5,414,601

[45] Date of Patent: May 9, 1995

[54] PROJECTION HEADLAMP LIGHTING SYSTEM FOR PROJECTING A WIDE SPREAD CONTROLLED PATTERN OF LIGHT

[75] Inventors: John M. Davenport, Lyndhurst; Richard L. Hansler, Pepper Pike, both of Ohio; John L. Henkes, Latham, N.Y.

[73] Assignee: General Electric Company, Schenectady, N.Y.

[21] Appl. No.: 991,599

[22] Filed: Dec. 16, 1992

[51] Int. Cl.[6] .................... B60Q 1/04

[52] U.S. Cl. .................... 362/61; 362/243; 362/301

[58] Field of Search .................... 362/61, 293, 297, 298, 362/301, 346, 351, 294, 268

[56] References Cited

U.S. PATENT DOCUMENTS

| | | | |
|---|---|---|---|
| 1,398,973 | 12/1921 | Moore | 362/251 |
| 1,419,482 | 6/1922 | Wood | 362/297 |
| 4,620,269 | 10/1986 | Oyama | 362/301 |
| 4,868,726 | 9/1989 | Segashi | 362/351 |
| 4,914,747 | 4/1990 | Nino | 362/297 |
| 4,918,580 | 4/1990 | Nino | 362/61 |
| 5,143,445 | 9/1992 | Bateman et al. | 362/293 |
| 5,258,686 | 11/1993 | Segashi et al. | 362/293 |

FOREIGN PATENT DOCUMENTS

| | | | |
|---|---|---|---|
| 0726960 | 2/1966 | Canada | 362/298 |
| 2209338 | 9/1993 | Germany | 362/351 |
| 0180506 | 10/1984 | Japan | 362/317 |

*Primary Examiner*—Ira S. Lazarus
*Assistant Examiner*—Y. Quach
*Attorney, Agent, or Firm*—George E. Hawranko; Stanley C. Corwin

[57] ABSTRACT

A projection headlamp system is capable of projecting a wide spread controlled pattern of light for accommodating low and high beam illuminations. The projection headlamp system includes a curved reflector and a gas discharge lamp. The curved reflector has first and second optical focal points associated therewith positioned along an optical axis. The first focal point is within and closer to the curved reflector than the second focal point which is spaced from the reflector. The lamp is disposed within the curved reflector at the first focal point thereof and along the optical axis. The lamp is operable for generating light. The curved reflector is operable for receiving a substantial portion of the light generated by the lamp and for directing the light along the optical axis toward the second focal point thereof. An optical element such as a mask or mask-shaped mirror is positioned along the optical axis approximately at the second focal point of the reflector for creating an image of a well-defined sharp cutoff within the light from the reflector. A light projecting lens is positioned along the optical axis and spaced from the optical element at a distance approximately equal to the focal length of the lens for receiving light from the second focal point and projecting the light as a wide spread controlled pattern containing the image of the well-defined sharp cutoff to thereby provide a low beam illumination for vehicular use.

5 Claims, 3 Drawing Sheets

PROJECTION HEADLAMP LIGHTING SYSTEM FOR PROJECTING A WIDE SPREAD CONTROLLED PATTERN OF LIGHT

CROSS-REFERENCE TO RELATED APPLICATION

Reference is hereby made to the following copending U.S. patent application dealing with related subject matter and assigned to the assignee of the present invention: "Improved Light Source Design Using An Ellipsoidal Reflector" by John M. Davenport et al, assigned U.S. Ser. No. 07/660,388 and filed Feb. 25, 1991. (LD-10,152)

BACKGROUND OF THE INVENTION

1. Field of the Invention

The present invention relates generally to automotive lighting and, more particularly, to a projection headlamp system employing a combination of components for projecting a wide spread controlled pattern of light.

2. Description of the Prior Art

Incandescent projection headlamp systems have been available on automobiles for a number of years. More recently, projection headlamp systems employing metal halide discharge lamps have been proposed and demonstrated for use on automobiles. These systems use a mask to give the sharp cutoff required for an acceptable low beam illumination pattern.

With the present trend toward automobiles with lower hood lines, smaller projection headlamp systems are of growing interest to the automotive industry. However, the systems proposed thus far have certain inherent limitations making it difficult to reduce their size. Thus, the problem confronting projection headlamp designers is to make a system as small as possible while still providing a satisfactory light pattern.

Consequently, a need still exists for improvements in the design of projection headlamp systems.

SUMMARY OF THE INVENTION

The present invention provides a headlamp projection system designed to satisfy the aforementioned needs. The headlamp projection system of the present invention employs a unique combination of components for projecting a wide spread controlled pattern of light. The headlamp projection system is capable of miniaturization.

Accordingly, the present invention is directed to a projection headlamp system capable of projecting a wide spread controlled pattern of light for accommodating low and high beam illuminations for vehicular use. The projection headlamp system includes a low beam projection portion which comprises: (a) a curved reflector having first and second optical focal points associated therewith positioned along an optical axis, the first focal point being within and closer to the reflector than the second focal point which is spaced from the reflector; (b) a gas discharge lamp disposed within the curved reflector substantially at the first focal point thereof and along the optical axis, the lamp being operable for generating light, the reflector being operable for receiving a substantial portion of the light generated by the lamp and directing the light along the optical axis toward the second focal point thereof; (c) first means positioned along the optical axis approximately at the second focal point of the reflector for creating an image of a well-defined sharp cutoff within the light; and (d) second means having a known focal length and being positioned along the optical axis spaced from the first means at a distance approximately equal to the known focal length of the first means for receiving the light from the second focal point and projecting the light as a wide spread controlled pattern containing the image of the well-defined sharp cutoff to thereby provide a low beam illumination for a vehicle.

More particularly, the curved reflector is preferably an ellipsoidal reflector. The reflector has a substrate of glass material and a thin coating on an interior of the substrate forming a cold mirror surface. Also, the gas discharge lamp is preferably a low wattage metal halide arc tube. In a preferred embodiment, the reflector and lamp are oriented along a vertical axis. In an alternative embodiment, the reflector and lamp are oriented along a horizontal axis. The first means is a mask or a mask-shaped mirror, whereas the second means is a projecting lens. The projecting lens can be a Fresnel lens alone or combined with a cylindrical lens.

The low beam projection portion of the projection headlamp system also preferably includes a cold mirror positioned adjacent the optical axis for receiving light from the reflector along a first leg of the optical axis and reflecting the light along a second leg of the optical axis displaced substantially ninety degrees from the first leg of the optical axis. Alternatively, the system can include a hot mirror positioned along the optical axis for receiving light from the reflector along a first leg of the optical axis and transmitting the light along a second leg of the optical axis extending coaxially with the first leg thereof.

The present invention is also directed to a projection headlamp system which includes a housing, the above-defined low beam projection portion disposed in the housing, and a high beam projection portion disposed in the housing in side-by-side relation with the low beam projection portion. The high beam projection portion is substantially identical to the low beam projection portion except that it does not include the first means for creating the sharp cutoff image within the light.

These and other features and advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
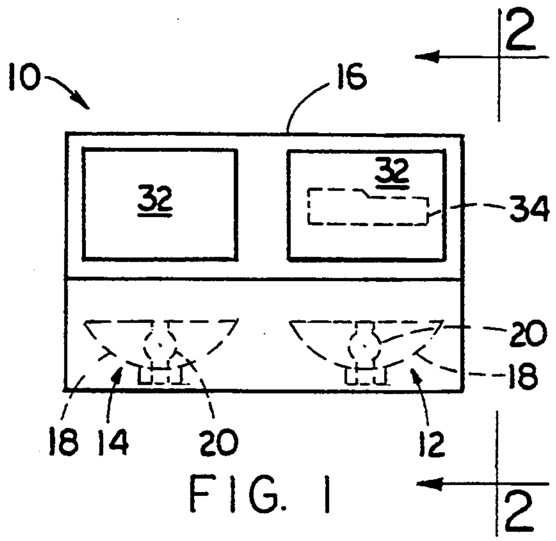
FIG. 1 is a diagrammatic front elevational view of a preferred embodiment of a projection headlamp system of the present invention combined in a single housing.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Figure 2:
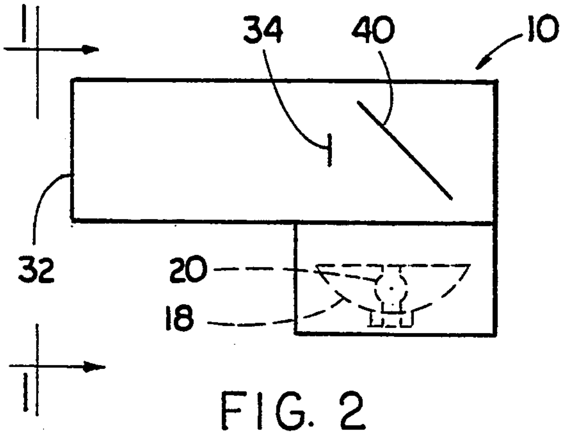
FIG. 2 is a diagrammatic side elevational view of the projection headlamp system as seen along line 2—2 of FIG. 1.
Figure 3:
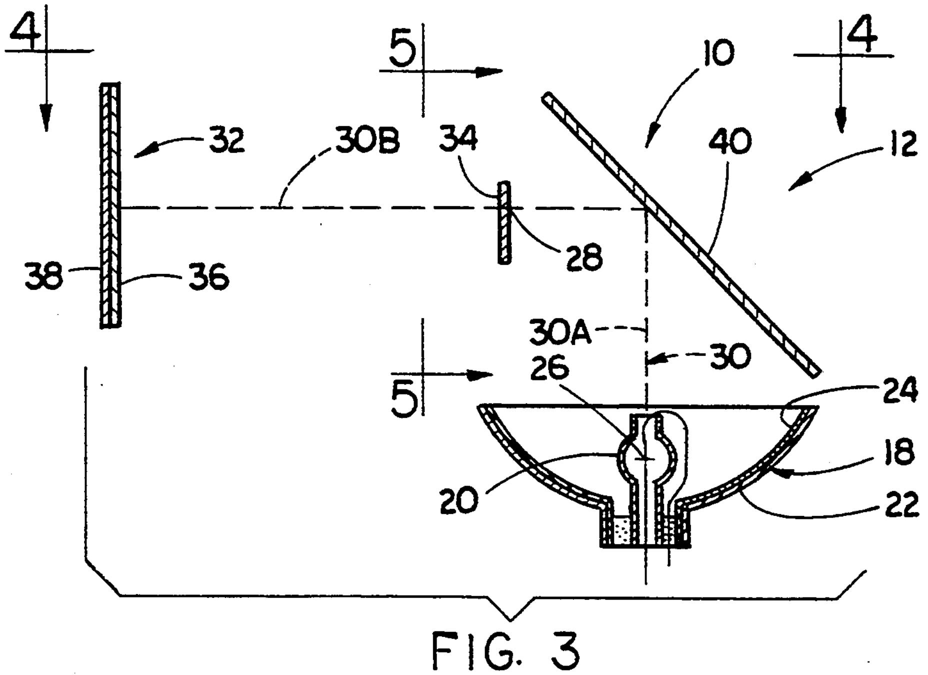
FIG. 3 is a sectional view through an optical axis of a low beam projection portion of the projection headlamp system of the present invention removed from the housing.
Figure 4:
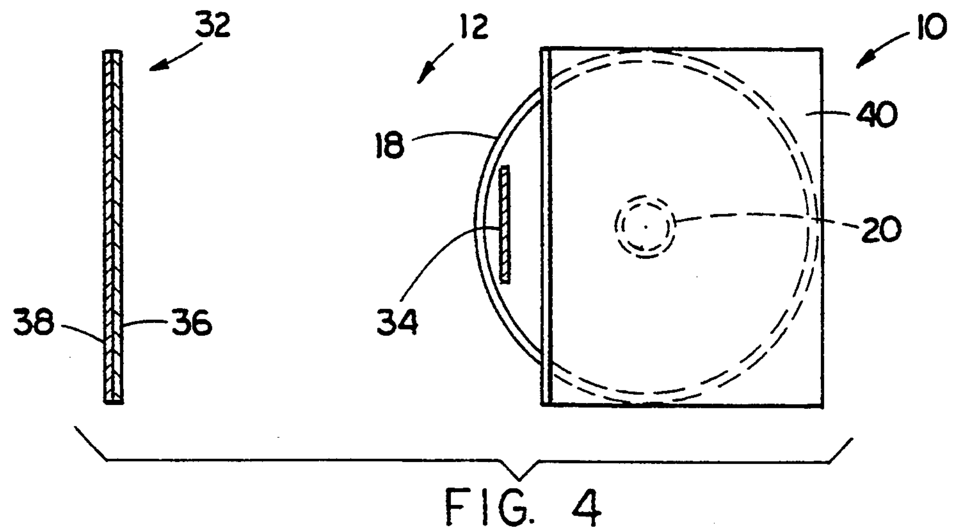
FIG. 4 is a top plan view of the low beam portion of the system as seen along line 4—4 of FIG. 3.

Referring now to the drawings, and particularly to FIGS. 1 to 3, there is illustrated a preferred embodiment of a projection headlamp system of the present invention, generally designated 10, which is capable of projecting a wide spread controlled pattern of light for accommodating both low and high beams for vehicular use. The projection headlamp system 10 basically includes a low beam projection portion 12 and a high beam projection portion 14 disposed in a side-by-side relation with one another in a single housing 16. As will be pointed out below, the high beam projection portion 14 is substantially identical to the low beam projection portion 12 except for the omission of one of the components of the low beam projection portion 12. In view of their similarities, only the low beam projection portion 12 will be described in detail hereinafter.

Referring to FIGS. 1–4, the low beam projection portion 12 of the system 10 basically includes a curved reflector 18 and a gas discharge lamp 20. The curved reflector 18 is preferably an ellipsoidal reflector 18 formed of high temperature materials having a substrate 22 fabricated of a suitable glass material and a thin coating 24 on an interior surface of the substrate 22. The thin coating 24 is a suitable material for forming a cold mirror surface. The ellipsoidal reflector 18 has first and second optical focal points 26, 28 associated therewith positioned along an optical axis 30 of the system 10. The first focal point 26 is within and closer to the ellipsoidal reflector 18 than the second focal point 28 which is spaced from the reflector 18.

Preferably, the gas discharge lamp 20 is a low wattage short gap metal halide arc tube 20. The metal halide arc lamp 20 is disposed within the ellipsoidal reflector 18 at the first focal point 26 thereof and along the optical axis 30. The metal halide arc lamp 20 is operable for generating a beam of light. The ellipsoidal reflector 18 is operable for receiving a substantial portion of the light generated by the lamp 20 and for directing the light along the optical axis 30 toward a cold mirror 40 and then to the second focal point 28 thereof. In the preferred embodiment of the system 10 shown in FIGS. 1–4, the ellipsoidal reflector 18 and the metal halide arc lamp 20 are oriented along a vertical axis which is coaxial with a first vertically-oriented leg 30A of the optical axis 30. In an alternative embodiment of the system 10 shown in FIG. 7, the ellipsoidal reflector 18 and the metal halide arc lamp 20 are oriented along a horizontal axis which is coaxial with the entire horizontally-oriented optical axis 30. The vertically-oriented operation is preferred over the horizontally-oriented operation since it offers the advantages of longer life and more uniform light distribution. For a more detailed discussion of the ellipsoidal reflector 18 and metal halide arc lamp 20 employed by the system 10, attention is directed to the copending patent application cross-referenced above whose disclosure is incorporated herein by reference.

Referring to FIGS. 2–5, the projection headlamp system 10 also includes a light projecting lens 32 and an optical element 34, such as a mirror 34A with an opaque mask 34B (FIG. 5), both of which are positioned along the optical axis 30. The opaque mask 34B is positioned approximately at the second focal point 28 of the ellipsoidal reflector 18 so that the optical element 34 creates an image of a well-defined sharp cutoff within the light from the reflector 18. This sharp cutoff occurs since the light rays striking optical element 34 will only pass through the portions of the hot mirror member 34A which is not covered by the opaque mask 34B thereby achieving the sharp cutoff image. The light projecting lens 32 has a known focal length. The brightness of the beam pattern must meet certain requirements and the maximum brightness in the pattern varies as the square of the focal length of the lens. This helps to determine the choice of lens selected. The lens 32 is positioned along the optical axis 30 spaced from the mask 34 at a distance approximately equal to the focal length of the lens 32 for receiving light from the second focal point 28. The lens 32 is capable of projecting the light as a wide spread controlled or collimated pattern containing the image of the well-defined sharp cutoff to thereby provide a low beam illumination for a vehicular use. The projecting lens 32 can be a Fresnel lens 36 alone or combined with a cylindrical lens 38 for producing the desired light pattern for low and high beam illumination.

Figure 5:
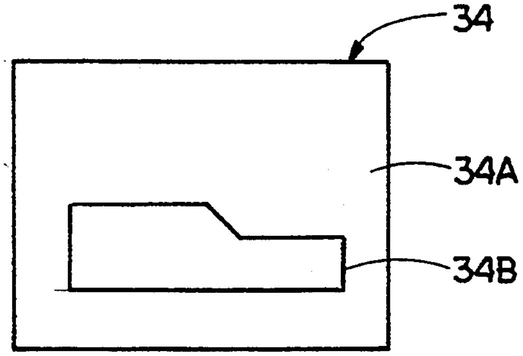
FIG. 5 is an enlarged front elevational view of an opaque mask of the system as seen along line 5—5 of FIG. 3.
Figure 6:
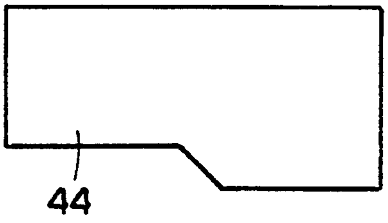
FIG. 6 is an enlarged front elevational view of an optical element which combines mask and mirror functions and be employed in the system of FIG. 3 in place of the mask of FIG. 5.
Figure 7:
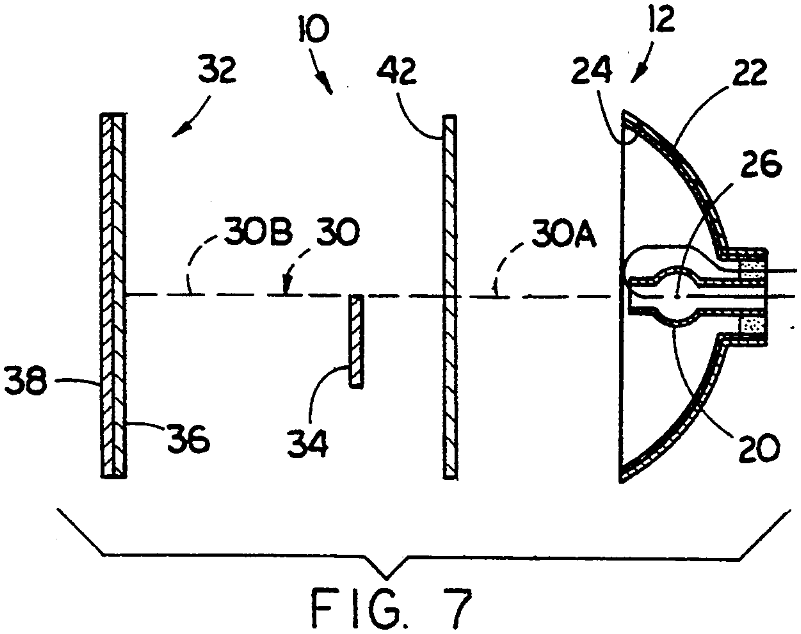
FIG. 7 is a sectional view through an optical axis of the low beam projection portion of an alternative embodiment of the projection headlamp system of the present invention.

The projection headlamp system 10 also includes a mirror 40 (FIG. 3) or mirror 42 (FIG. 7) positioned adjacent the optical axis 30 for receiving light from the ellipsoidal reflector 18 along the first leg 30A of the optical axis 30. A "cold" mirror as used herein is one which reflects visible light and passes UV and IR energy. A "hot" mirror as used herein is one which reflects UV and IR energy and passes visible light. In FIG. 3, the mirror 40 is a cold mirror positioned at forty-five degrees to the first leg 30A of the optical axis 30 for reflecting the light along a second leg 30B of the optical axis 30 being displaced substantially ninety degrees from the first leg 30A of the optical axis 30. Alternatively, as seen in FIG. 7, a hot mirror 42 can be positioned along the optical axis 30 for receiving light from said reflector along the first leg 30A of the optical axis 30 and reflecting the light along the second leg 30B thereof extending coaxially with the first leg 30A thereof. Alternatively, instead of the mask 34 and the mirror 40, a mask-shaped mirror 44 such as seen in FIG. 6 can be utilized. In other words, rather than having a two-piece mirror and mask configuration as shown in FIG. 5, a mirror 44 can be constructed which has a lower contoured edge shaped to match the top profile of the mask portion 34B of the optical member 34.

As mentioned above, the high beam projection portion 14 of the system 10 disposed in the same housing 16 in side-by-side relation with the low beam projection portion 12 is substantially identical thereto. The only difference is that the high beam projection portion 14 does not employ the mask 34 (nor the mask-shaped mirror 44) since a sharp cutoff image is not required on high beam.

Figure 8:
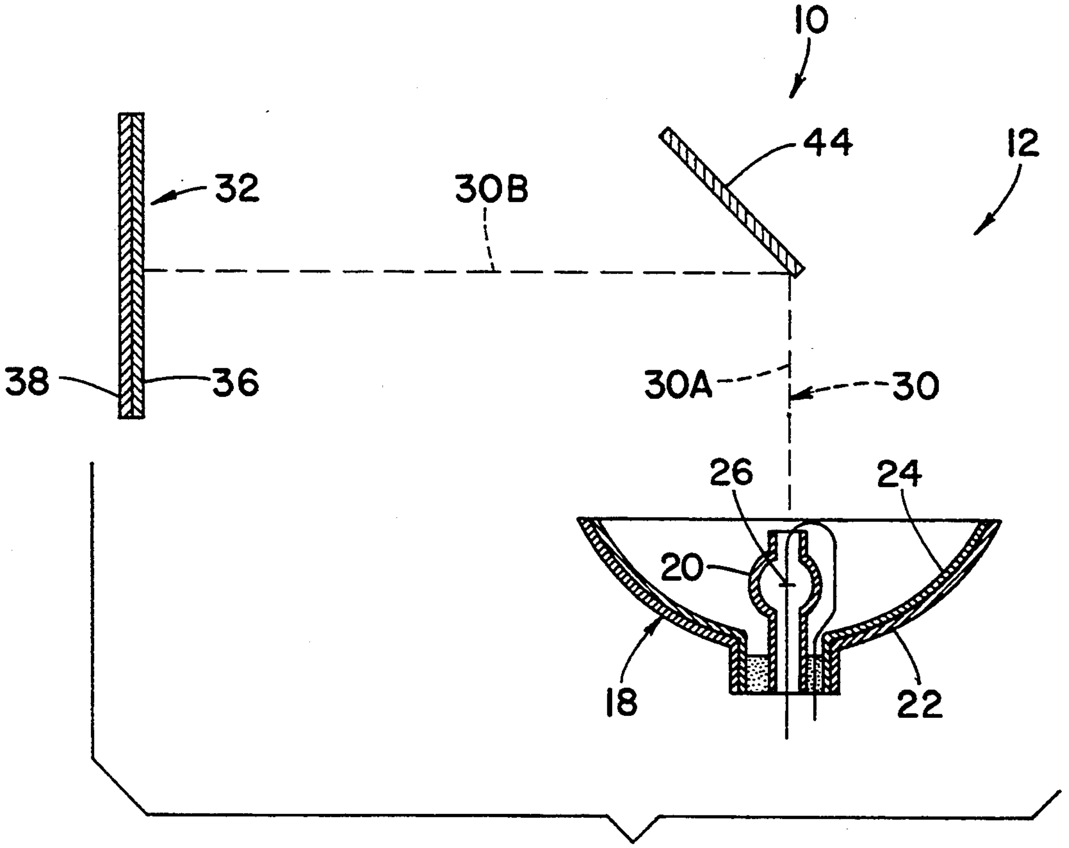
FIG. 8 is a sectional view of a projection headlamp system of the present invention incorporating the optical element of FIG. 6.

As seen in FIG. 8 a projection headlamp system 10 employing the optical element 44 of FIG. 6 is essentially the same as shown in FIG. 3 except that the mask element 34 is no longer required.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

We claim:

1. A projection headlamp system, comprising:

(a) a curved reflector having first and second optical focal points associated therewith positioned along an optical axis, said first focal point being within and closer to said reflector than said second focal point which is spaced from said reflector;

(b) a gas discharge lamp disposed within said curved reflector substantially at said first focal point thereof and along said optical axis, said lamp being operable for generating light, said reflector being operable for receiving a substantial portion of said light generated by said lamp and directing said light along said optical axis;

(c) a cold mirror positioned on said optical axis for receiving light from said reflector along a first leg of said optical axis and reflecting said light toward said second focal point along a second leg of said optical axis displaced substantially ninety degrees from said first leg of said optical axis;

(d) first means positioned adjacent said optical axis for creating an image of a well-defined sharp cutoff of light;

(e) second means having a known focal length and being positioned along said optical axis spaced from said first means at a distance approximately equal to said known focal length for receiving said light from said second focal point and projecting said light as a wide spread controlled pattern containing said image of said well-defined sharp cutoff to thereby provide a low beam illumination for a vehicle and;

(f) wherein said first means is a contoured edge formed on said cold mirror and effective such that light directed along said optical axis is only reflected on to said second means with such light strikes said cold mirror above said contoured edge.

2. The system as recited in claim 1, wherein said curved reflector is an ellipsoidal reflector.

3. The system as recited in claim 1, wherein said reflector has a substrate of glass material and a thin coating of high temperature materials on an interior of said substrate forming a cold mirror surface.

4. The system as recited in claim 1, wherein said reflector and lamp are oriented along a vertical axis.

5. The system as recited in claim 1, wherein said second means is a Fresnel lens and a cylindrical lens combined with said Fresnel lens.

* * * * *